United States Patent
Sudo et al.

(10) Patent No.: US 10,321,057 B2
(45) Date of Patent: Jun. 11, 2019

(54) IMAGING DEVICE AND CONTROL METHOD THEREFOR

(71) Applicant: SONY CORPORATION, Tokyo (JP)

(72) Inventors: Ichiro Sudo, Tokyo (JP); Hiroshi Sasahara, Kanagawa (JP); Ken Nakagawa, Tokyo (JP); Takuji Moriya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/752,910

(22) PCT Filed: Jul. 27, 2016

(86) PCT No.: PCT/JP2016/072033
§ 371 (c)(1),
(2) Date: Feb. 15, 2018

(87) PCT Pub. No.: WO2017/043206
PCT Pub. Date: Mar. 16, 2017

(65) Prior Publication Data
US 2018/0249080 A1 Aug. 30, 2018

(30) Foreign Application Priority Data
Sep. 7, 2015 (JP) .................................. 2015-175701

(51) Int. Cl.
*H04N 5/232* (2006.01)
*H04N 5/225* (2006.01)

(52) U.S. Cl.
CPC ..... *H04N 5/23245* (2013.01); *H04N 5/23241* (2013.01); *H04N 5/232411* (2018.08); *H04N 5/2252* (2013.01)

(58) Field of Classification Search
CPC combination set(s) only.
See application file for complete search history.

(56) References Cited

U.S. PATENT DOCUMENTS

2003/0071912 A1* 4/2003 Minakuti ........... H04N 1/00278
                                                                   348/372
2003/0123873 A1* 7/2003 Okubo .................... G03B 15/05
                                                                   396/155
2011/0050977 A1* 3/2011 Park .................... H04N 5/23241
                                                                   348/333.13

FOREIGN PATENT DOCUMENTS

JP    2002-101037 A    4/2002
JP    2004-180077 A    6/2004
(Continued)

OTHER PUBLICATIONS

International Search Report and Written Opinion of PCT Application No. PCT/JP2016/072033, dated Aug. 30, 2016, 08 pages.
(Continued)

*Primary Examiner* — Ahmed A Berhan
(74) *Attorney, Agent, or Firm* — Chip Law Group

(57) ABSTRACT

A function relating to communication of imaging data is assigned to an operational switch of an operating unit 32. A control unit 310 switches a working mode of the assigned assignment function among a stop mode in which power supply to a communication unit 307 that communicates the imaging data is stopped, a standby mode in which standby is performed to enable the communication of the imaging data by supplying power to the communication unit 307, and an executing mode in which the imaging data is communicated, depending on operational duration of the operational switch. In a case where the imaging data is not communicated, the assignment function is set to the stop mode, thereby realizing power saving. Further, the working mode of the assignment function can be switched depending on the operational duration of the operational switch, which improves the operability of an imaging device.

13 Claims, 6 Drawing Sheets

(56) References Cited

FOREIGN PATENT DOCUMENTS

| JP | 2009-060504 A | 3/2009 |
|---|---|---|
| JP | 2011-128266 A | 6/2011 |
| JP | 4922848 B2 | 4/2012 |
| JP | 2012-174044 A | 9/2012 |

OTHER PUBLICATIONS

"JVC Partners With Ustream for Single-Button Streaming", Apr. 27, 2015, The Broadcast Bridge, 4 pages.

* cited by examiner

IMAGING DEVICE AND CONTROL METHOD THEREFOR

CROSS REFERENCE TO RELATED APPLICATIONS

This application is a U.S. National Phase of International Patent Application No. PCT/JP2016/072033 filed on Jul. 27, 2016, which claims priority benefit of Japanese Patent Application No. JP 2015-175701 filed in the Japan Patent Office on Sep. 7, 2015. Each of the above-referenced applications is hereby incorporated herein by reference in its entirety.

TECHNICAL FIELD

The technology relates to an imaging device, a control method therefor, and a program, and can realize power saving and improvement of operability.

BACKGROUND ART

In recent years, an imaging device has been provided with a function not only for recording imaging data on a recording medium, but also for transferring imaging data that has been in progress of imaging or been imaged to a server or the like via a network. Further, such a technology is disclosed that, regarding an electronic device having a communication function, connection to a network is easy and unintended connection is not implemented. For example, in Patent Literature 1, the use of a wireless-communication interface is controlled depending on whether or not a wired cable is connected to a wired-communication interface.

CITATION LIST

Patent Literature

Patent Literature 1: JP 4922848B

DISCLOSURE OF INVENTION

Technical Problem

Incidentally, with a transfer function of imaging data provided for an imaging device, power is consumed with a working for ensuring a stable communication path even in a case other than transferring the imaging data. Therefore, in an imaging device driven by a battery, there is a possibility that the imaging-available time can be short. Further, with an imaging device not provided with a wired-communication interface, the use of the wireless-communication interface cannot be controlled depending on whether or not a wired cable is connected.

Accordingly, it is an object of the technology to provide an imaging device, a control method therefor, and a program which can realize the power saving and the improvement of operability.

Solution to Problem

A first aspect of the technology is an imaging device including: an operational switch, to which a function relating to communication of imaging data is assigned, that is configured to switch a working mode of an assigned assignment function; a communication unit that communicates the imaging data; and a control unit that switches the assignment function among a stop mode in which power supply to the communication unit is stopped, a standby mode in which standby is performed to enable the communication of the imaging data by supplying power to the communication unit, and an executing mode in which the imaging data is communicated, depending on operational duration of the operational switch.

With the technology, a function relating to communication of imaging data is assigned to an operational switch provided to an area on a side surface of a device main body that enters a field-of-view of a user, e.g., in response to removal of the user's eye from a view finder. Further, a working mode of an assignment function assigned to the operational switch is switched depending on operational duration of the operational switch. For example, when the operational duration of the operational switch exceeds a preset threshold, the assignment function is switched between a stop mode in which power supply to a communication unit is stopped and a standby mode in which standby is performed to enable the communication of the imaging data by supplying power to the communication unit. Furthermore, when the operational duration is a threshold or less in the standby mode, switching is performed from the standby mode to an executing mode in which the communication of the imaging data is performed, and switching is performed from the executing mode to the standby mode depending on an operation of the operational switch in the executing mode.

The assignment function of the operational switch can be changed, for example, it is possible to select any of a function for accepting communication function control from a receiving side of the imaging data, a transfer processing function of the imaging data generated at end time of the imaging, a streaming transfer function of the imaging data, and an editing function for editing a list showing the imaging data as a transfer candidate in place of the communication of the imaging data.

Further, an illuminating unit is provided to the operational switch, and illumination of the operational switch is switched depending on the working mode of the assignment function. For example, the illumination is extinguished in a case of the stop mode, and the illumination is performed with a first color in a case of the standby mode and with a second color different from the first color in a case of the executing mode. Furthermore, the illumination is lit in the standby mode and the executing mode, and the illumination is flickered during mode switching between the stop mode and the standby mode.

A second aspect of the technology is a control method of an imaging device, including: assigning a function relating to communication of imaging data to an operational switch; and switching a working mode of an assignment function assigned to the operational switch among a stop mode in which power supply to a communication unit that communicates the imaging data is stopped, a standby mode in which standby is performed to enable the communication of the imaging data by supplying power to the communication unit, and an executing mode in which the imaging data is communicated, depending on operational duration of the operational switch.

A third aspect of the technology is a program for causing a computer to execute control of an imaging device, the program causing the computer to execute a procedure of switching a working mode of a function relating to communication of imaging data that is assigned to an operational switch among a stop mode in which power supply to a communication unit that communicates the imaging data is stopped, a standby mode in which standby is performed to enable the communication of the imaging data by supplying power to the communication unit, and an executing mode in which the imaging data is communicated, depending on operational duration of the operational switch.

Note that a program of the present technology is, for example, a program that can be provided to a general-purpose computer capable of executing various program codes by a storage medium or communication medium for providing a program in a computer readable form (for example, the storage medium such as an optical disc, a magnetic disk, or a semiconductor memory or the communication medium such as a network). Such a program is provided in a computer readable form, and therefore processing corresponding to the program is realized in a computer.

Advantageous Effects of Invention

With the technology, the function relating to communication of imaging data is assigned to an operational switch. Further, depending on operational duration of the operational switch, the working mode of the assigned function is switched among a stop mode in which power supply to a communication unit that communicates the imaging data is stopped, a standby mode in which standby is performed to enable the communication of the imaging data by supplying power to the communication unit, and an executing mode in which the imaging data is communicated. Therefore, for example, in a case where the imaging data is not communicated, power saving can be realized by setting the working mode of the assignment function to the stop mode. Further, the working mode of the assignment function can be switched depending on the operational duration of the operational switch, which improves the operability of the imaging device. Additionally, the effects described herein are merely exemplified effects, but not limitative. There may also be additional effects.

MODE(S) FOR CARRYING OUT THE INVENTION

Hereinbelow, a description will be given to an embodiment of the present technology. Note that the description will be given in the following order.
1. Configuration of external appearance of imaging device
2. Functional configuration of imaging device
3. Working of imaging device <1. Configuration of External Appearance of Imaging Device>

Figure 1:
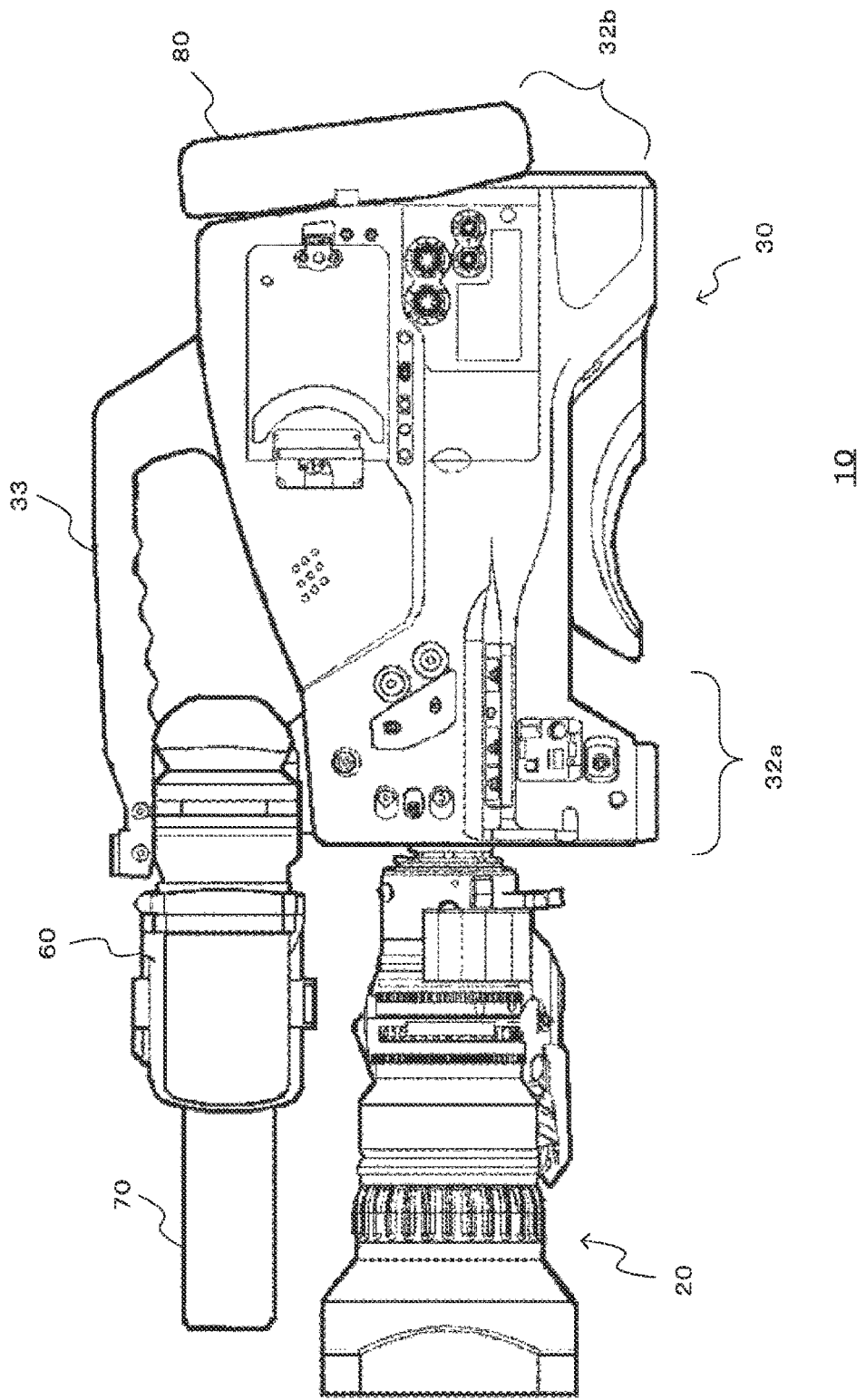
FIG. 1 is a diagram illustrating an example of external appearance of an imaging device.

FIG. 1 is a diagram illustrating an example of external appearance of an imaging device of the present technology, e.g., illustrating a left side surface of the imaging device.

An imaging device 10 includes a lens unit 20, a device main body 30, a view finder 60, a microphone 70, and the like.

The lens unit 20 is attached to a front surface of the device main body 30. The lens unit 20 has an imaging lens that collects light from a subject and a zooming mechanism that varies an optical magnification of the imaging lens within a predetermined range, and the like.

A handle unit 33 is formed onto an upper surface of the device main body 30. The handle unit 33 is provided so as to be gripped with the hand of a user for holding the imaging device 10 when the user brings the imaging device 10 or uses the imaging device 10 at a low position. The view finder 60 is provided to the left side surface on the front end side of the handle unit 33, and the microphone 70 is provided to the right side surface thereof. The view finder 60 displays a camera-through image, an image recorded on a recording medium, a menu image, various kinds of information, and the like. The microphone 70 collects ambient sound and generates an audio signal.

A battery 80 for supplying power necessary for working the imaging device 10 is attached to a rear surface of the device main body 30.

An operating unit 32a is provided on a front side of the left side surface of the device main body 30, and an operating unit 32b is provided on a rear side thereof. The operating unit 32a includes an operational switch to which a function is fixed in advance, an assignable switch as an operational switch to which the user can assign the function, and the like.

Figure 2:
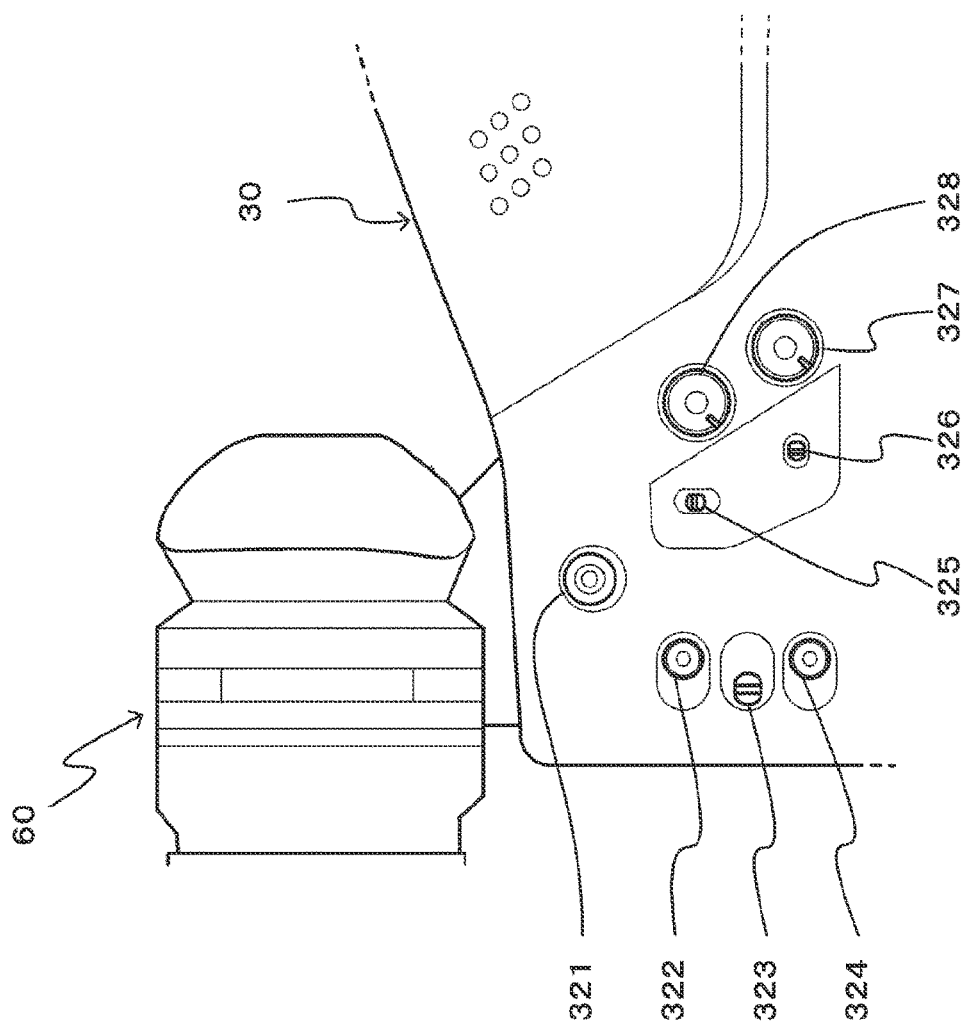
FIG. 2 is a diagram in which an operating unit provided on a front side of a left side surface of the imaging device is enlarged.
Figure 3:
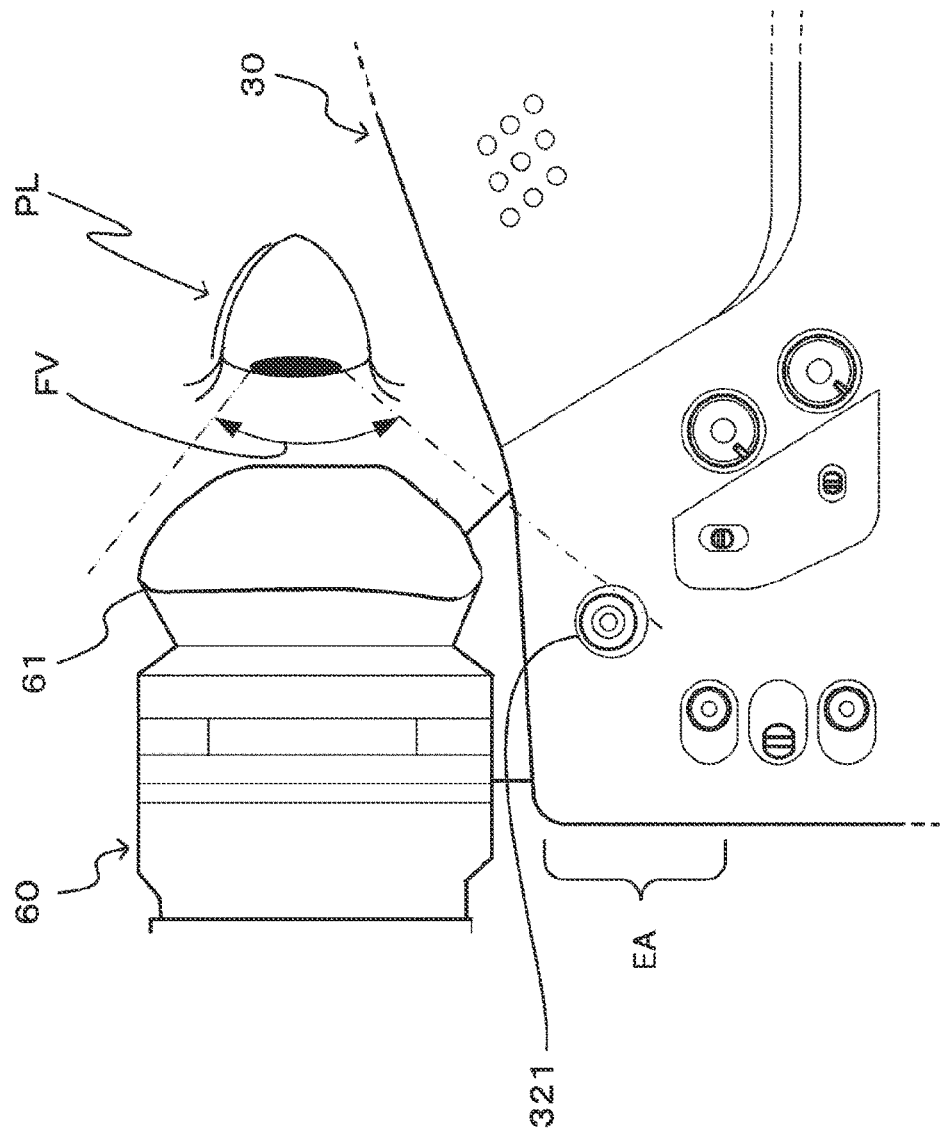
FIG. 3 is a diagram illustrating a positional relationship between a press button switch and a user.

FIG. 2 is a diagram in which the operating unit provided on a front side of the left side surface of the imaging device is enlarged. A press button switch 321 of the operating unit 32a is an assignable switch, and is provided to an area of a side surface of the device main body that enters a field-of-view of the user in response to removal of user's eye from the view finder 60. FIG. 3 illustrates a positional relationship between the press button switch and the user. For example, the press button switch 321 is provided to an area EA of a left side surface of the device main body 30 that enters a field-of-view FV of a user PL when the user PL removes the eye from an eye cup 61 of the view finder 60 and the left side surface of the device main body 30 enters the field-of-view FV of the user PL. If the press button switch 321 is provided to such a position, the user PL can easily check the position of the press button switch 321 and the mode of the assignment function, which will be described later, without largely moving the position of the head at the imaging time. A function relating to the communication of the imaging data is assigned to the press button switch 321, and the working mode of the assigned assignment function is switched with a switch pressing operation of the press button switch 321.

Further, not only the press button switch 321 but also press button switches 322 and 324, slide switches 323, 325, and 326, operational knobs 327 and 328, and the like are provided to the operating unit 32a. It is possible to assign to the press button switches 322 and 324, for example, any of a stereo/monaural switching function when the microphone 70 is a stereo-microphone, a function for enabling deletion of a clip that is imaged just before, a function for turning-on/off an automatic tracing white balance working, a rec/review function, a function for starting or stopping the recording, and the like. It is possible to assign, to the slide switch 323, any of the above-mentioned stereo/monaural switching function, a function for turning-on/off zebra display of the view finder 60, a function for turning-on/off marker display, and the like. The slide switches 325 and 326 can select sound output via a built-in speaker or an earphone with hearing check using the two switches. The operational knob 327 is used when adjusting the volume of sound output via the built-in speaker or the earphone. The operational knob 328 is used when adjusting the volume of alarm sound.

Note that the operating unit 32b positioned on a rear side of the left side surface of the device main body 30 in FIG. 1 includes an operational button for dividing a clip, an operational button for switching counter display, and the like.

<2. Functional Configuration of Imaging Device>

Figure 4:
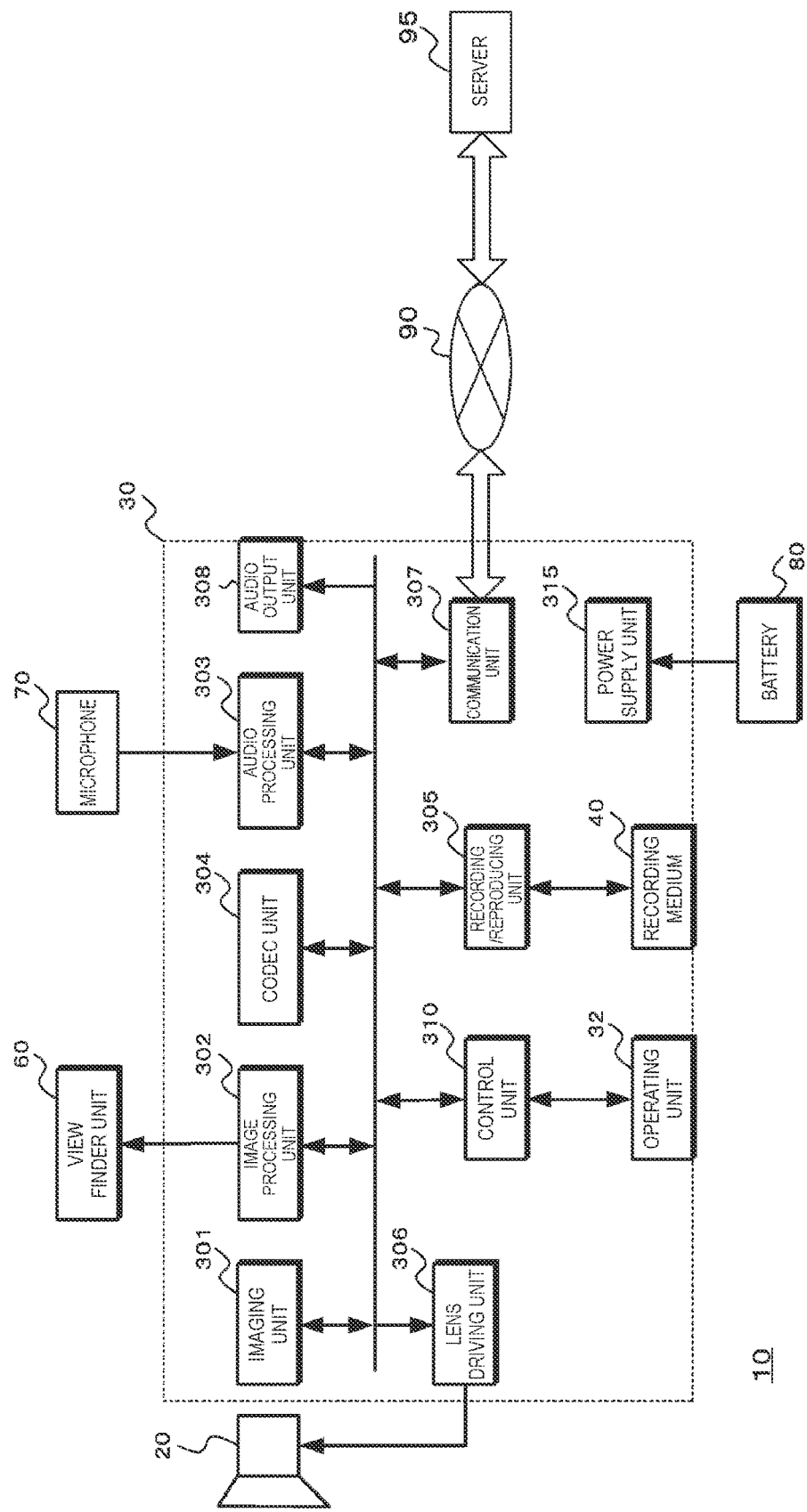
FIG. 4 is a diagram illustrating an example of functional blocks of the imaging device.

FIG. 4 is a diagram illustrating an example of functional blocks of the imaging device. The device main body 30 of the imaging device 10 includes an imaging unit 301, an image processing unit 302, an audio processing unit 303, a codec unit 304, a recording/reproducing unit 305, a lens driving unit 306, a communication unit 307, an audio output unit 308, a control unit 310, a power supply unit 315, an operating unit 32, and the like.

The imaging unit 301 includes, e.g., an imaging element such as a complementary metal-oxide semiconductor device (CMOS) or a charge-coupled device (CCD). The imaging unit 301 photoelectrically converts an optical image formed on an imaging surface with the lens unit 20, generates the imaging data, and outputs the data to the image processing unit 302.

The image processing unit 302 performs noise removing processing, gain adjusting processing, and adjusting processing of luminance or color for image data generated by the imaging unit 301. Further, the image processing unit 302 performs processing for converting the image data after the adjusting processing or the image data read by the recording/reproducing unit 305 into image data corresponding to the number of pixels of the view finder 60 and processing for superimposing display data such as menu display on the image data. Furthermore, the image processing unit 302 may perform image processing of a view-finder image, e.g., processing for enlarging and displaying the central part, or the like so as to easily obtain a desired captured image. The audio processing unit 303 amplifies an audio signal generated via the microphone and performs processing such as analog/digital conversion, thereby generating audio data.

The codec unit 304 performs encoding processing of the image data processed by the image processing unit 302, the audio data processed by the audio processing unit 303, or the like, and compresses the amount of data of the image data or audio data at a data compression ratio instructed from the control unit 310. The codec unit 304 outputs the image data or the audio data after the data compression, as the imaging data, to the recording/reproducing unit 305 or the communication unit 307. Further, the codec unit 304 performs decoding processing of the imaging data supplied from the recording/reproducing unit 305, supplies the obtained image data to the image processing unit 302 to perform an adjustment of the size, and the like, and outputs the data to the view finder 60 so as to allow the user to check the recorded image. Furthermore, the codec unit 304 supplies audio data obtained by performing the decoding processing to the audio output unit 308, so that the recorded sound can be checked by the output from the audio output unit 308.

The recording/reproducing unit 305 performs processing for recording the imaging data supplied from the codec unit 304 on a recording medium 40, and processing for reading out the imaging data recorded on the recording medium 40 and outputting the data to the codec unit 304 or the communication unit 307, on the basis of an instruction from the control unit 310. Additionally, the recording medium 40 may be a detachable recording medium, or a recording medium that is provided and fixed in the device main body 30. Moreover, the imaging data may include a setting state at the imaging time, information for managing the imaging data, or the like.

The lens driving unit 306 drives the lens unit 20 to set a desired zooming ratio on the basis of an instruction from the control unit 310. Further, the lens driving unit 306 may perform focus adjustment to set, to have a clear image, an optical image combined on an imaging surface of the imaging element in the imaging unit 301.

The communication unit 307 implements connection to a network 90 by using a wired or wireless communication path. Further, the communication unit 307 establishes a communication path with a server 95 connected to the network 90 to enable the reception of control information showing an instruction, a request, or the like sent from the server 95, the transfer of the imaging data to the server 95, or the like.

The audio output unit 308 performs digital/analog conversion or the like of audio data supplied from the audio processing unit 303 or the codec unit 304, generates an audio output signal, and supplies the signal to a speaker or an audio output terminal, so that sound to be recorded or recorded sound can be checked.

Although not shown, the control unit 310 includes, e.g., a central processing unit (CPU), an electrically erasable programmable ROM (EEPROM), a read only memory (ROM), a random access memory (RAM), and the like. Programs for executing various control processing in the control unit 310 are stored in the ROM of the control unit 310. The CPU works on the basis of the programs, and executes arithmetic operation/control processing required for each control by using the RAM. Not only the programs are stored in advance in the ROM included in the control unit 310 but also may be stored in a removable recording medium and be provided to the device main body 30, or be downloaded to the device main body 30 via a network such as a LAN or the Internet.

The control unit 310 controls each of the units to perform workings in response to the user operation in the imaging device 10 on the basis of the user operation to the operating unit 32. The control unit 310 turns on/off the power of the imaging device 10 on the basis of, e.g., a user operation to a power switch. Further, the control unit 310 controls the lens driving unit 306 on the basis of the user operation to a zooming switch, and changes a focal distance of the lens unit 20 in response to the user operation. Furthermore, the control unit 310 starts or stops the recording of the imaging data on the basis of the user operation to an REC button.

Further, the control unit 310 controls execution of the assignment function with assignment of the function to the operational switch, change of the assigned function, and the user operation to the operational switch to which a function is assigned. Additionally, as mentioned above, it is possible to assign, to the operational switch to which the function can be assigned, the function of the communication of the imaging data, a stereo/monaural switching function, a clip deleting function, an on/off function of an auto-trace white balance working, a rec/review function, and the like.

The power supply unit 315 supplies power to each of the units in the imaging device 10 from the battery 80 attached to the device main body 30.

The operating unit 32 includes the operational switches of the operating units 32a and 32b provided to the left side surface of the device main body 30, and operational switches provided to the rear surface, the top surface, the right side surface, or the like of the device main body 30. The operating unit 32 generates an operational signal in response to a switch operation of the user, and outputs the signal to the control unit 310. Further, operational switches that enable the user, as mentioned above, to assign the function and change the assigned function are provided to the operating unit 32.

<3. Working of Imaging Device>

Next, operations and workings of the press button switch will be described. The press button switch 321 is a press button switch with an illumination, and includes an operating unit, an illuminating unit, and a tactile switch. The operating unit includes a light-shielding unit 321a having, e.g., a circular operating surface and a circular indicator unit 321b provided to the center of the operating surface. The indicator unit 321b includes a member through which light is transmitted. The illuminating unit includes a light emitting element such as a light emitting diode (LED). Light emitted from the illuminating unit is externally output via the indicator unit 321b. Further, with a press operation of the press button switch, an on/off-working of the tactile switch is performed. Furthermore, the control unit switches the working mode of the assignment function assigned to the press button switch, depending on the press operation of the press button switch. In addition, the control unit performs driving control of the illuminating unit, depending on a functional state, and enables the user to determine what the working mode of the function is with light output via the indicator unit 321b.

As mentioned above, the function relating to the communication of the imaging data is assigned to the press button switch 321. Further, as the working mode of the assignment function, the stop mode, the standby mode, and the executing mode are provided. The stop mode is a mode in which power supply to the communication unit that communicates the imaging data is stopped. The standby mode is a mode in which standby is performed to establish the communication path with the server and enable the communication of the imaging data or the like by supplying power to the communication unit. The executing mode is a mode in which the imaging data or the like is communicated with the server.

Figure 5:
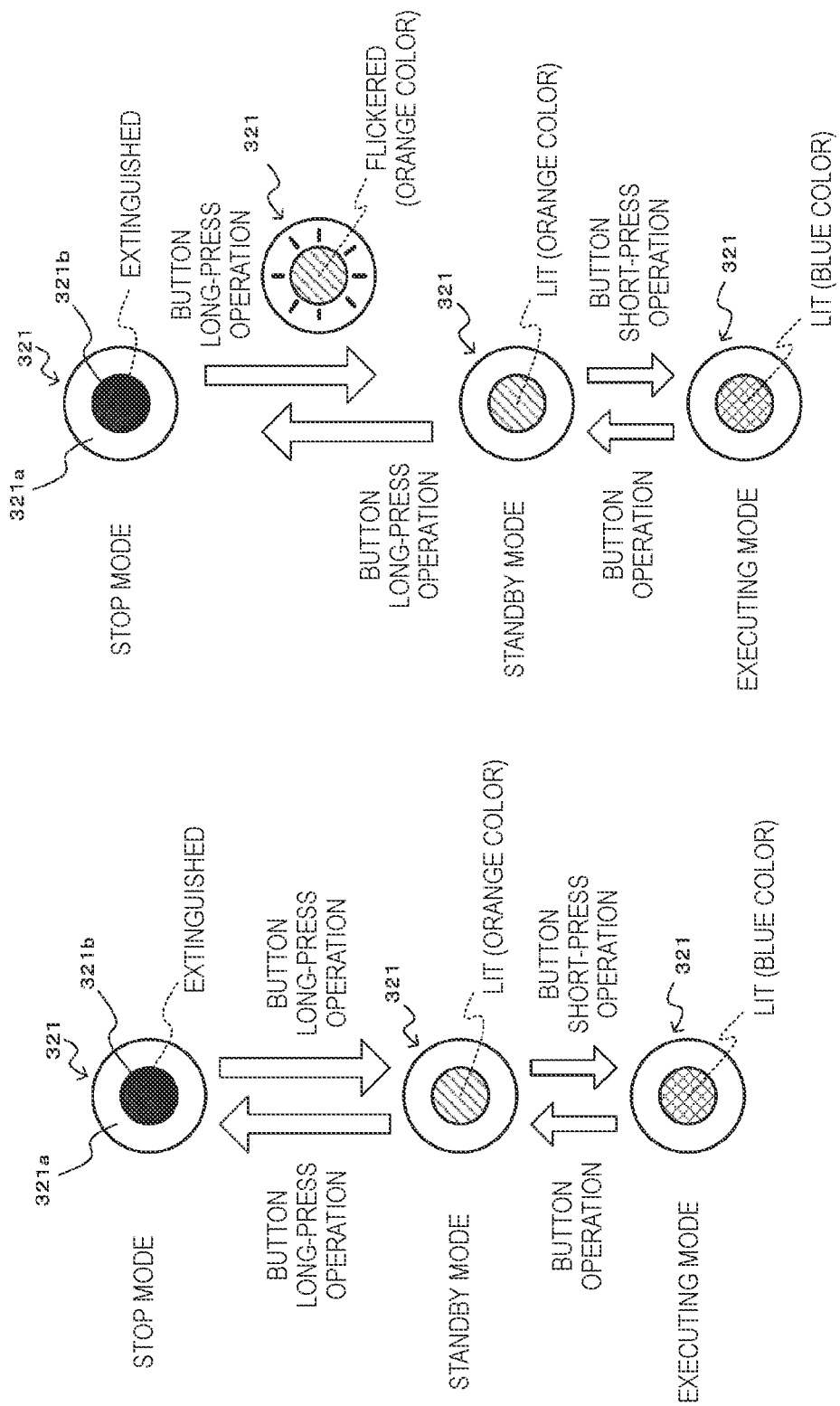
FIG. 5 is a diagram for explaining a relationship between an operation of the press button switch and a working mode of an assignment function.

FIG. 5 is a diagram for explaining a relationship between the operation of the press button switch and the working mode of the assignment function. As illustrated in (a) of FIG. 5, for example, a switch press operation is performed in the stop mode, and in a case where the operational duration exceeds a preset threshold, that is, in a case where a button long-press operation is performed, switching is performed from the stop mode to the standby mode. Further, in order to easily check the mode of the assignment function, for example, the illuminating unit is set to an extinguished state in the stop mode, and the illuminating unit is lit with a first color (e.g., orange color) in the standby mode.

Next, in the standby mode, the switch press operation is performed, in a case where the operational duration is the threshold or less, that is, in a case where the button short-press operation is performed, switching is performed from the standby mode to the executing mode, and the illuminating unit is lit with a second color (e.g., blue color) in the executing mode. Further, in a case where the button long-press operation is performed, switching is performed from the standby mode to the stop mode. In a case where the switch press operation is performed in the executing mode, switching is performed from the executing mode to the standby mode.

Further, there is a case where it takes time to switch the mode, depending on the assignment function. In such a case, the illuminating unit may be driven so that it can be determined that the mode is being switched. For example, in a case where time is required to establish the communication path with the server or the like and time from the stop mode to the standby mode is long, in order to enable determination that the stop mode is being switched to the standby mode, as illustrated in (b) of FIG. 5, the illuminating unit is flickered with the first color (e.g., orange color). Furthermore, in a case where it takes time that the assignment function is switched from the standby mode to the stop mode, in order to enable determination that the standby mode is being switched to the stop mode, the illuminating unit is flickered with the first color (e.g., orange color).

The function that can be assigned to the press button switch 321 can be changed. Table 1 illustrates an example of the function that can be assigned to the press button switch 321.

TABLE 1

| Assignable function | Contents of function |
| --- | --- |
| First function | Client mode working |
| Second function | Auto-upload working |
| Third function | Streaming transfer working |
| Fourth function | Editing working |

A first function is a function of a so-called client mode working in which the imaging data can be subjected to transfer control from the receiving side of the imaging data. If the function of the client mode working is in the executing mode, the imaging device 10 accepts a data sending request from the server and transfers the imaging data to the server. The imaging data to be transferred may be any of data during the imaging and data recorded on a recording medium after completing the imaging, and data that is instructed from the server may be transferred. Further, the imaging device 10 not only accepts the data sending request from the server, but also may accept the control information to make it possible to designate the amount of delay until, e.g., reception from the server. Furthermore, the server may designate a compression ratio of the imaging data that is generated during the imaging, the codec unit may perform encoding processing at the designated compression ratio, and the communication unit may transfer the imaging data generated by the codec unit to the server. In addition, the imaging device 10 may adjust the image quality such as setting of color temperature on the basis of an instruction from the server with the image processing unit.

A second function is a function for a so-called auto-upload working for automatically transferring the imaging data. If the function of the auto-upload working is in the executing mode, the imaging device 10 automatically transfers the imaging data registered in the transfer standby list to the transfer destination designated in advance by the user or the like. Further, the imaging device 10 automatically adds a file of the imaging data generated during the imaging to the transfer standby list at the completion time of the imaging, thereby transferring the generated imaging data to the designated transfer destination.

A third function is a function of a so-called streaming transfer working in which the imaging data generated during the imaging is sequentially transferred. In a case where the function of the streaming transfer working is in the executing mode, the imaging device 10 sequentially transfers the imaging data generated during the imaging to the transfer destination designated in advance by the user or the like. That is, if the function of the streaming transfer working is set in the executing mode and the imaging is performed, the streaming transfer becomes possible from the imaging start time.

A fourth function is a function of an editing working that enables editing of the transfer standby list. In a case where the function of the editing working is in the executing mode, the imaging device 10 displays, e.g., an editing screen of the transfer standby list on the view finder or the like. Referring to the editing screen, addition, deletion, change in order, start or stop of the transfer, or the like, of the imaging data with respect to the transfer standby list can be performed.

Note that a function that can be assigned to the press button switch is not limited to any of the four functions illustrated in Table 1, and a function that is not disclosed in Table 1, e.g., a function of color temperature adjustment or the like can be assigned and color temperature according to the user's favorite may be registered to be available. Further, a function can be assigned selectively from any plurality of functions among the four functions illustrated in Table 1.

Figure 6:
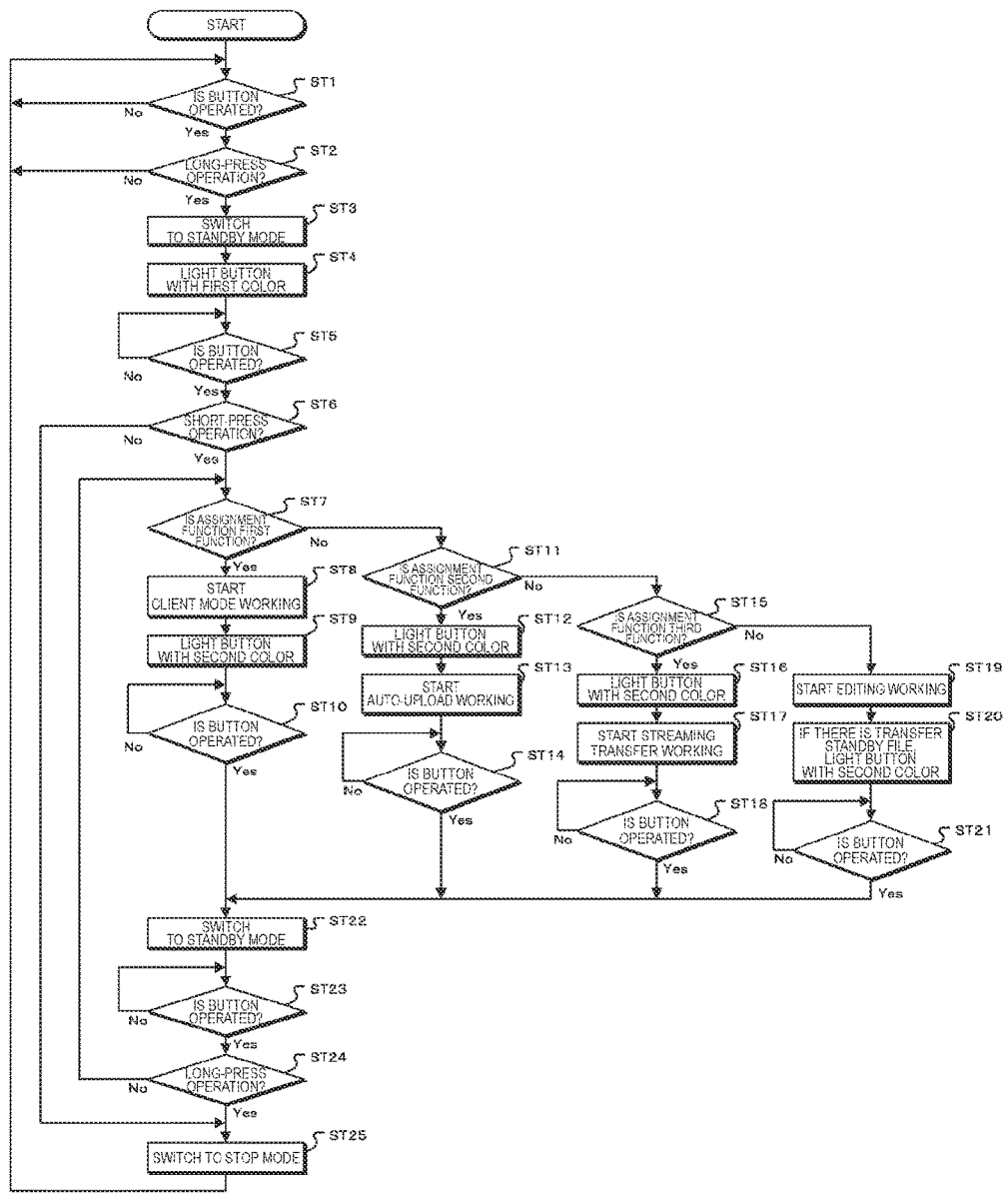
FIG. 6 is a flowchart illustrating an example of switching of the working mode of the assignment function.

FIG. 6 is a flowchart illustrating an example of switching of the working mode of the assignment function. Any one of the assignable functions illustrated in Table 1 is assigned to the press button switch 321. The assignment function is in the stop mode at the time of the start of working. Additionally, regarding the assignment of the function to the press button switch 321, the menu screen is displayed on the view finder or the like and an operation is performed in response to the display of the menu screen, thereby enabling the setting or change of the function.

In step ST1, the control unit determines whether the button operation is performed. The control unit 310 determines whether the press button switch 321 is operated. In a case where the control unit 310 determines that the press button switch 321 is not operated, the flow returns to step ST1. In a case where the control unit 310 determines that the press operation thereof is performed, the flow advances to step ST2.

In step ST2, the control unit determines whether the operation is the long-press operation. In a case where the operational duration of the press operation to the press button switch 321 exceeds the threshold, the control unit 310 determines that the long-press operation is performed, and the flow advances to step ST3. Further, in a case where the press operation ends before the operational duration exceeds the threshold, the control unit 310 determines that the long-press operation is not performed and the flow returns to step ST1.

In step ST3, the control unit performs switching to the standby mode. The control unit 310 switches the assignment function from the stop mode to the standby mode. The control unit 310 starts to supply power to the communication unit 307. Further, the control unit 310 establishes the communication path with the server 95 to set a state in which the communication with the server 95 can be performed quickly, and the flow advances to step ST4.

In step ST4, the control unit lights the button with the first color. The control unit 310 lights the illuminating unit of the press button switch 321 with the first color with switching from the stop mode to the standby mode, and the flow advances to step ST5.

In step ST5, the control unit determines whether the button operation is performed. The control unit 310 determines whether the press button switch 321 is operated. In a case where the control unit 310 determines that the press button switch 321 is not operated, the flow returns to step ST5. In a case where the control unit 310 determines that the press operation thereof is performed, the flow advances to step ST6.

In step ST6, the control unit determines whether the operation is the short-press operation. In a case where the press operation to the press button switch 321 ends before the operational duration exceeds the threshold, the control unit 310 determines that the short-press operation is performed and the flow advances to step ST7. Further, in a case where the operational duration exceeds the threshold, the control unit 310 determines that the operation is not the short-press operation but the long-press operation is performed, and the flow advances to step ST25. That is, in a case where the user performs the short-press operation in order to switch the assignment function from the standby mode to the executing mode, the control unit 310 performs control so that the flow advances to step ST7. In a case where the user performs the long-press operation in order to return the assignment function from the standby mode to the stop mode, the control unit 310 performs control so that the flow advances to step ST25.

In step ST7, the control unit determines whether the assignment function is the first function. In a case where the assignment function of the press button switch 321 is the first function (client mode working), the control unit 310 performs control so that the flow advances to step ST8. In a case where the assignment function of the press button switch 321 is not the first function, the control unit 310 performs control so that the flow advances to step ST11.

In step ST8, the control unit starts the client mode working. The control unit 310 switches the assignment function from the standby mode to the executing mode, starts the client mode working enabling the transfer control of the imaging data from the receiving side of the imaging data, and the flow advances to step ST9.

In step ST9, the control unit lights the button with the second color. The control unit 310 lights the illuminating unit of the press button switch 321 with the second color with switching from the standby mode to the executing mode, and the flow advances to step ST10.

In step ST10, the control unit determines whether the button operation is performed. The control unit 310 determines whether the press button switch 321 is operated. In a case where the control unit 310 determines that the press button switch 321 is not operated, the flow returns to step ST10. In a case where the control unit 310 determines that the press operation thereof is performed, the flow advances to step ST22.

Advancing from step ST7 to step ST11, in step ST11, the control unit determines whether the assignment function is the second function. In a case where the assignment function of the press button switch 321 is the second function (auto-upload working), the control unit 310 performs control so that the flow advances to step ST12. In a case where the assignment function of the press button switch 321 is not the second function, the control unit 310 performs control so that the flow advances to step ST15.

In step ST12, the control unit lights the button with the second color. The control unit 310 lights the illuminating unit of the press button switch 321 with the second color with switching operation from the standby mode to the executing mode, and the flow advances to step ST13.

In step ST13, the control unit starts the auto-upload working. The control unit 310 switches the assignment function from the standby mode to the executing mode and starts the auto-upload working for automatically transferring the imaging data, and the flow advances to step ST14.

In step ST14, the control unit determines whether the button operation is performed. The control unit 310 determines whether the press button switch 321 is operated. In a case where the control unit 310 determines that the press button switch 321 is not operated, the flow returns to step ST14. In a case where the control unit 310 determines that the press operation thereof is performed, the flow advances to step ST22.

Advancing from step ST11 to step ST15, in step ST15, the control unit determines whether the assignment function is the third function. In a case where the assignment function of the press button switch 321 is the third function (streaming transfer working), the control unit 310 performs control so that the flow advances to step ST16. In a case where the assignment function of the press button switch 321 is not the third function, that is, the fourth function (editing working), the control unit 310 performs control so that the flow advances to step ST19.

In step ST16, the control unit lights the button with the second color. The control unit 310 lights the illuminating unit of the press button switch 321 with the second color with switching operation from the standby mode to the executing mode, and the flow advances to step ST17.

In step ST17, the control unit starts the streaming transfer working. The control unit 310 switches the assignment function from the standby mode to the executing mode and starts the streaming transfer working for sequentially transferring the imaging data that is generated during the imaging, and the flow advances to step ST18.

In step ST18, the control unit determines whether the button operation is performed. The control unit 310 determines whether the press button switch 321 is operated. In a case where the control unit 310 determines that the press button switch 321 is not operated, the flow returns to step ST18. In a case where the control unit 310 determines that the press operation thereof is performed, the flow advances to step ST22.

In step ST19, the control unit starts the editing working. The control unit 310 switches the assignment function from the standby mode to the executing mode and starts the editing working for editing the transfer standby list, and the flow advances to step ST20.

In step ST20, the control unit lights the button with the second color if there is the transfer standby file. In a case where there is a non-transferred file in the transfer standby list, the control unit 310 lights the illuminating unit of the press button switch 321 with the second color, and the flow advances to step ST21.

In step ST21, the control unit determines whether the button operation is performed. The control unit 310 determines whether the press button switch 321 is operated. In a case where the control unit 310 determines that the press button switch 321 is not operated, the flow returns to step ST21. In a case where the control unit 310 determines that the press operation thereof is performed, the flow advances to step ST22.

In step ST22, the control unit performs switching to the standby mode. The press button switch 321 is operated in the executing mode and the control unit 310 thus switches the assignment function from the executing mode to the standby mode, and the flow advances to step ST23.

In step ST23, the control unit determines whether the button operation is performed. The control unit 310 determines whether the press button switch 321 is operated. In a case where the control unit 310 determines that the press button switch 321 is not operated, the flow returns to step ST23. In a case where the control unit 310 determines that the press operation thereof is performed, the flow advances to step ST24.

In step ST24, the control unit determines whether the operation is the long-press operation. In a case where the operational duration of the press operation to the press button switch 321 exceeds the threshold, the control unit 310 determines that the long-press operation is performed, and the flow advances to step ST25. Further, in a case where the press operation ends before the operational duration exceeds the threshold, the control unit 310 determines that the short-press operation is performed and the flow returns to step ST7. That is, in a case where the user performs the short-press operation in order to switch the assignment function from the standby mode to the executing mode, the control unit 310 performs control so that the flow advances to step ST7. In a case where the user performs the long-press operation in order to return the assignment function from the standby mode to the stop mode, the control unit 310 performs control so that the flow advances to step ST25.

In step ST25, the control unit performs the switching to the stop mode. The control unit 310 switches the assignment function from the standby mode to the stop mode. The control unit 310 stops the power supply to the communication unit 307 and the flow returns to step ST1.

Note that the working of the imaging device 10 is not limited to the flowchart illustrated in FIG. 6. For example, the determination of the assignment function may be performed in another order. Further, in a case where it is determined that the long-press working is performed in step ST2, it may be determined which of the first function to the fourth function the assignment function is, the determined function may be switched to the standby mode. In this case, with the short-press operation when the determined function is in the standby mode, the function is switched from the standby mode to the executing mode. Furthermore, regarding the change of the assignment function of the press button switch 321, the change may be performed not only in a case where the assignment function is in the stop mode but also in the standby mode.

With the present technology as described above, in a case where the function relating to the communication of the imaging data that is assigned to the press button switch 321 is in the stop mode, the power supply to the communication unit for transferring the imaging data is stopped. Therefore, in a case where the imaging data does not need to be transferred, power consumption can be prevented in a functional block for transferring the imaging data, and a long-time working is possible in battery driving. Further, the press button switch to which the function relating to the communication of the imaging data is assigned is provided to the area of the side surface of the device main body that enters the field-of-view of the user in response to the removal of the user's eye from the view finder. Therefore, the user can visually recognize the press button switch with ease. For example, without performing the operation or the like for displaying the menu screen on the view finder or the like and instructing the transfer of the imaging data, it is possible to easily transfer the imaging data. Furthermore, the mode of the assignment function is shown with the illumination of the press button switch 321. Therefore, the user can easily check in which mode the assignment function is with the indicator unit 321b of the press button switch 321.

Note that, in the above-described embodiments, the case is shown as an example in which the operational switch to which the function relating to the communication of the imaging data is assigned is the press button switch. However, the operational switch is not limited to the press button switch. For example, by using an auto-return-type slide switch to which an elastic member to return an operating member to the initial position is provided, the standby mode may be switched to the stop mode or the executing mode, depending on the operational duration of a slide operation. Further, the working of the illuminating unit corresponding to the working mode of the assignment function is an example, and the illumination may be performed with a different color and different driving may be performed depending on the working mode. Furthermore, the user may be able to determine the working mode by using a method different from the illumination, for example, a different display method or sound, or the like.

A series of processing described herein can be executed by hardware, software, or the combination thereof. In a case of executing the processing by the software, the processing can be executed by installing the program in which the processing sequence is recorded in the memory of the computer embedded in the dedicated hardware, or can be executed by installing the program in the general-purpose computer that can execute various processing.

For example, the program can be recorded on a hard disk, a solid state drive (SSD) or read only memory (ROM) as a recording medium in advance. Alternatively, the program can be temporarily or permanently stored (recorded) in (on) a removable recording medium such as a flexible disk, a compact disc read only memory (CD-ROM), Magneto Optical (MO) disk, a digital versatile disc (DVD), a Blu-Ray Disc (registered trademark) (BD), a magnetic disk, or a semiconductor memory card. Such a removable recording medium can be provided as so-called package software.

In addition, the program can be, not only installed on a computer from a removable recording medium, but also transferred wirelessly or by wire to the computer from a download site via a network such as a LAN (Local Area Network) or the Internet. In such a computer, a program transferred in the aforementioned manner can be received and installed on a recording medium such as built-in hardware.

Note that the effects described in the present specification are merely examples, not limitative; and additional effects that are not described may be exhibited. Furthermore, the present technology is not interpreted as being limited to the above-described embodiments of the technology. The embodiments of the technology disclose the present technology in the form of exemplification, and it is obvious that a person skilled in the art can make modification or substitution of the embodiments without departing from the gist of the present technology. In other words, in order to determine the gist of the present technology, the claims should be considered.

Additionally, the present technology may also be configured as below.

(1)

An imaging device including:

an operational switch, to which a function relating to communication of imaging data is assigned, that is configured to switch a working mode of an assigned assignment function;

a communication unit that communicates the imaging data; and a control unit that switches the assignment function among a stop mode in which power supply to the communication unit is stopped, a standby mode in which standby is performed to enable the communication of the imaging data by supplying power to the communication unit, and an executing mode in which the imaging data is communicated, depending on operational duration of the operational switch.

(2)

The imaging device according to (1), in which when the operational duration of the operational switch exceeds a preset threshold, the control unit switches the assignment function between the stop mode and the standby mode, and when the operational duration is the threshold or less in the standby mode, the control unit performs switching from the standby mode to the executing mode, and performs switching from the executing mode to the standby mode, depending on an operation of the operational switch in the executing mode.

(3)

The imaging device according to (1) or (2), in which the assignment function of the operational switch is changeable.

(4)

The imaging device according to any one of (1) to (3), in which a function that is assignable to the operational switch is a function for accepting communication function control from a receiving side of the imaging data.

(5)

The imaging device according to any one of (1) to (4), in which a function that is assignable to the operational switch is a transfer processing function of imaging data that is generated at end time of imaging.

(6)

The imaging device according to any one of (1) to (5), in which a function that is assignable to the operational switch is a streaming transfer function of the imaging data.

(7)

The imaging device according to any one of (1) to (6), in which a function that is assignable to the operational switch is an editing function for editing a list showing the imaging data as a transfer candidate in place of the communication of the imaging data.

(8)

The imaging device according to any one of (1) to (7), in which an illuminating unit is provided to the operational switch, and the control unit controls the illuminating unit to switch illumination of the operational switch depending on the mode of the assignment function.

(9)

The imaging device according to (8), in which the control unit extinguishes the illumination in a case of the stop mode, performs the illumination with a first color in a case of the standby mode, and performs the illumination with a second color different from the first color in a case of the executing mode.

(10)

The imaging device according to (8) or (9), in which the control unit lights the illumination in the standby mode and the executing mode, and flickers the illumination during mode switching between the stop mode and the standby mode.

(11) The imaging device according to any one of (1) to (10), in which the operational switch is provided to an area of a side surface of a device main body that enters a field-of-view of a user in response to removal of an eye of the user from a view finder.

INDUSTRIAL APPLICABILITY

With the imaging device, the control method therefor, and the program according to this technology, the function relating to the communication of the imaging data is assigned to the operational switch. Further, the working mode of the assigned assignment function is switched among the stop mode in which the power supply to the communication unit that communicates the imaging data is stopped, the standby mode in which standby is performed to enable the communication of the imaging data by supplying power to the communication unit, and the executing mode in which the imaging data is communicated, depending on the operational duration of the operational switch. Therefore, in a case where the imaging data is not communicated, the working mode of the assignment function is set to the stop mode, thereby realizing the power saving. Further, the working mode of the assignment function can be switched depending on the operational duration of the operational switch, which improves the operability of the imaging device. Therefore, it is suitable to the imaging device used for a system that obtains the imaging data via the network and creates video contents or the like.

REFERENCE SIGNS LIST 10 imaging device
20 lens unit
30 device main body
32, 32a, 32b operating unit
33 handle unit
40 recording medium
60 view finder
61 eye cup
70 microphone
80 battery
90 network
95 server
301 imaging unit
302 image processing unit
303 audio processing unit
304 codec unit
305 recording/reproducing unit
306 lens driving unit
307 communication unit
308 audio output unit
310 control unit
315 power supply unit
321, 322, 324 press button switch
321a light-shielding unit
321b indicator unit
323, 325, 326 slide switch
327, 328 operational knob

The invention claimed is:

1. An imaging device, comprising:
   an operational switch configured to switch a working mode of an assignment function, wherein a function related to communication of imaging data is assignable to the operational switch;
   a communication interface configured to communicate the imaging data; and
   a control unit configured to switch the working mode of the assignment function, based on an operational duration of the operational switch, among a stop mode in which power supply to the communication interface is stopped, a standby mode in which the communication of the imaging data is enabled by supply of power to the communication interface, and an executing mode in which the imaging data is communicated.

2. The imaging device according to claim 1, wherein the control unit is further configured to:
   switch the assignment function between the stop mode and the standby mode based on the operational duration of the operational switch that exceeds a threshold duration,
   switch from the standby mode to the executing mode based on the operational duration in the standby mode is equal to or less than the threshold duration, and
   switch from the executing mode to the standby mode based on an operation of the operational switch in the executing mode.

3. The imaging device according to claim 1, wherein the assignment function of the operational switch is changeable.

4. The imaging device according to claim 1, wherein the operational switch is further configured to accept communication function control from a receiving side of the imaging data based on the function that is assignable to the operational switch.

5. The imaging device according to claim 1, wherein the function that is assignable to the operational switch is a transfer processing function of the imaging data, and
   wherein the control unit is further configured to generate the transfer processing function at an end imaging operation.

6. The imaging device according to claim 1, wherein the function that is assignable to the operational switch is a streaming transfer function of the imaging data.

7. The imaging device according to claim 1, wherein the function that is assignable to the operational switch is an editing function, and
   wherein the control unit is further configured to edit that shows the imaging data as a transfer candidate in place of the communication of the imaging data.

8. The imaging device according to claim 1, wherein the operational switch includes an illuminating unit, and
   the control unit is further configured to control the illuminating unit to switch illumination of the operational switch based on the working mode of the assignment function.

9. The imaging device according to claim 8, wherein the control unit is further configured to:
   extinguish the illumination of the operational switch based on the working mode being the stop mode,
   illuminate the operational switch with a first color based on the working mode being the standby mode, and
   illuminate the operational switch with a second color different from the first color based on the working mode being the executing mode.

10. The imaging device according to claim 8, wherein the control unit is further configured to:
    light the illumination in the standby mode and the executing mode; and
    flicker the illumination during mode switching between the stop mode and the standby mode.

11. The imaging device according to claim 1, wherein the operational switch is on an area of a side surface of a device main body that enters a field-of-view of a user based on removal of an eye of the user from a view finder.

12. A control method, comprising:
    assigning a function relating to communication of imaging data to an operational switch;
    communicating, via a communication interface, the imaging data; and
    switching a working mode of the assigned function, based on an operational duration of the operational switch, among a stop mode in which power supply to the communication interface is stopped, a standby mode in which the communication of the imaging data is enabled by supplying power to the communication interface, and an executing mode in which the imaging data is communicated.

13. A non-transitory computer-readable medium having stored thereon, computer-executable instructions which when executed cause a computer to execute operations, the operations comprising:
    assigning a function relating to communication of imaging data to an operational switch;
    communicating, via a communication interface, the imaging data; and
    switching a working mode of the assigned function, based on an operational duration of the operational switch, among a stop mode in which power supply to the communication interface is stopped, a standby mode in which the communication of the imaging data is enabled by supplying power to the communication interface, and an executing mode in which the imaging data is communicated.

* * * * *